United States Patent [19]

Kobayashi et al.

[11] Patent Number: 4,907,040
[45] Date of Patent: Mar. 6, 1990

[54] THIN FILM SCHOTTKY BARRIER DEVICE

[75] Inventors: Hiroshi Kobayashi; Taxay Sato; Hiroshi Menjo; Shinichi Nishi; Hideo Watanabe, all of Hino, Japan

[73] Assignee: Konishiroku Photo Industry Co., Ltd., Tokyo, Japan

[21] Appl. No.: 96,520

[22] Filed: Sep. 15, 1987

[30] Foreign Application Priority Data

| Sep. 17, 1986 | [JP] | Japan | 61-217046 |
|---|---|---|---|
| Apr. 6, 1987 | [JP] | Japan | 62-83011 |
| Apr. 6, 1987 | [JP] | Japan | 62-83012 |
| Apr. 6, 1987 | [JP] | Japan | 62-83013 |
| Apr. 6, 1987 | [JP] | Japan | 62-83014 |
| Apr. 6, 1987 | [JP] | Japan | 62-83015 |
| Apr. 6, 1987 | [JP] | Japan | 62-83016 |
| Apr. 6, 1987 | [JP] | Japan | 62-83017 |

[51] Int. Cl.$^4$ .................. H01L 29/48; H01L 27/10
[52] U.S. Cl. ............................ 357/4; 357/2; 357/15; 357/45
[58] Field of Search ............ 357/2, 15, 4, 45; 350/336, 334

[56] References Cited

U.S. PATENT DOCUMENTS

| 4,223,308 | 9/1980 | Baraff et al. | 350/334 |
|---|---|---|---|
| 4,630,893 | 12/1986 | Credelle et al. | 350/334 |
| 4,697,331 | 10/1987 | Boulitrop et al. | 350/336 |

FOREIGN PATENT DOCUMENTS

| 2537316 | 6/1984 | France . | |
|---|---|---|---|
| 59-57273 | 4/1984 | Japan | 357/4 |
| 61-116880 | 6/1986 | Japan | 357/4 |
| 61-175624 | 8/1986 | Japan . | |
| 61182266 | 8/1986 | Japan | 357/4 |
| 61198678 | 9/1986 | Japan | 357/2 |
| 2146827 | 4/1985 | United Kingdom . | |

OTHER PUBLICATIONS

Szydlo et al., *Japan Display* 83, 10.6, "Integrated Matrix . . . Diodes", pp. 416–418.
Szydlo et al., *Appl. Phys. Lett.* 44 (2) Jan. 15, 1984, "New Amorphous . . . Addressing", pp. 205–206.
International Display Research Conference, Society for Information Display, 1983, pp. 416–418 (N. Szydlow, "Integrated Matrix Addressed LCD Using Amorphous Silicon Back to Back Diodes").
Proceedings of the Society for Information Display, Vol. 26, No. 1, 1985, pp. 9–15, New York, S. Togashi et al., "An LC-TV Display Controlled by Amorphous Silicon Diode Rings".

*Primary Examiner*—Andrew J. James
*Assistant Examiner*—Jerome Jackson, Jr.
*Attorney, Agent, or Firm*—Finnegan, Henderson, Farabow, Garrett and Dunner

[57] ABSTRACT

Disclosed are an active matrix element and a method of manufacturing the same, wherein two first electrode layers are formed on a substrate, semiconductor thin films are formed on regions including the two first electrode layers, respectively, a second electrode layer is formed on the semiconductor thin layers and constituting Schottky barriers between the semiconductor layers and the second electrode layer.

29 Claims, 6 Drawing Sheets

THIN FILM SCHOTTKY BARRIER DEVICE

BACKGROUND OF THE INVENTION

1. Field of the Invention

The present invention relates to a display device active matrix element used for driving a display element such as an element using electroluminescence (EL) or electrochromism (EC) in a matrix display device, and a method of manufacturing the same.

2. Description of the Prior Art

In a conventional matrix display device constituted by display elements such as liquid crystal, EL, or EC elements, a high-density matrix is required to obtain a precise image having a high resolution. In recent years, so-called active matrix display has received a great deal of attention as a technique for causing switching elements to directly drive display elements so as to satisfy the above needs.

A 3-terminal element such as a thin-film transistor or a 2-terminal element such as a thin-film diode, a varistor, and an MIM (a metal-insulator-metal multilayer) is proposed to be used as the above switching element.

Since an element such as a varistor and an MIM has a high threshold voltage (i.e., a voltage generated upon an abrupt increase in current), a high drive voltage is required. When such an element is used as a switching element for active matrix display, power consumption is undesirably increased. A thin-film transistor cannot be easily manufactured as compared with a thin-film diode.

The thin-film diode has advantages in that (1) the element structure is simple and a display device having a sophisticated matrix structure can be manufactured at a high yield, and (2) image quality is high. Therefore, it is suitable to use the thin-film diode as a switching element for active matrix display.

An example of the thin-film diode as a switching element for active matrix display is described in "Japan Display '83", N. Szydlo, et al., Proc. IDRC., PP. 416–418, 1983, in which Schottky diodes are connected in series with each other and are reverse-biased (i.e., back-to-back diode circuit). Another example is described in Japan Unexamined Patent Publication No. 59-57273, in which PIN or Schottky diodes are connected in parallel with each other and are reverse-biased (i.e., a ring diode circuit).

A conventional liquid crystal cell using such a back-to-back diode circuit is shown in FIG. 1. Referring to FIG. 1, reference numeral 20 denotes an upper substrate; 21, a lower substrate; 22, a counter electrode layer; 23, a pixel electrode layer; 24 and 25, alignment layers; 26, a liquid crystal layer; 27, a passivation layer; and 29, an active matrix element of a back-to-back diode circuit. In the active matrix element 29, reference numeral 30 denotes a conductive layer of an $n^+$-type semiconductor; 31, a semiconductor layer; 32 and 33, metal layers for forming a Schottky barrier; 34, a scanning electrode layer; and 35, a pixel electrode lead layer integrally formed with the pixel electrode layer.

A conventional back-to-back diode circuit described in Japan Unexamined Patent Application No. 61-116880 is shown in FIG. 2. Referring to FIG. 2, reference numeral 40 denotes a glass substrate; 41, a metal film; 42 and 43, Schottky electrodes; 44, an amorphous silicon film; 45, an $n^+$-type amorphous silicon film; and 46, an ohmic contact. Reference symbols T1 and T2 denote terminals.

In the active matrix element 29 having the above structure, a large number of masks are required during the fabrication. In addition, the passivation layer 27 must be undesirably formed, and contact holes must be formed in the passivation layer 27 to form the scanning electrode layer 34 and the pixel electrode lead layer 35. Thus, a larger number of fabrication steps are required to decrease the product yield. Furthermore, the three-dimensional bulky pattern on the surface of the active matrix element is typical, and therefore the layers constituting the element tend to peel and are subjected to damage such as electrical disconnections. From these points of view, the product yield is further decreased. It is also difficult to form uniform alignment layer having equal pretilt angles and/or alignment directions when liquid crystal cells are formed, thus causing alignment errors.

In the conventional active matrix element described in Japan Unexamined Patent Application No. 61-116880, the element surface is flat, but the number of masks required to prepare the element is large. In addition, since the semiconductor layer is formed after the first electrode layer constituting the Schottky barrier is formed, a metal for forming the first electrode layer is exposed to a high temperature. Furthermore, when the semiconductor layer is formed by plasma CVD, the surface of the first electrode layer is damaged by a plasma. It is therefore difficult to control conditions of annealing performed for accelerating stable interfacial bonding between the surface of the first electrode layer on the semiconductor layer side and the surface of the semiconductor layer on the first electrode layer side. The performance of the resultant active matrix element is unstable and the element has poor reliability. In addition, the semiconductor layer tends to peel from the substrate.

SUMMARY OF THE INVENTION

The present invention has been made in consideration of the above situation, and has as its object to provide a display device active element having a small number of fabrication steps, a structure for allowing a high yield, and a flat pattern.

In order to achieve the above object of the present invention, there is provided an active matrix element of a pair of thin-film diodes connected in series and reverse-biased with each other, wherein the pair of thin-film diode comprises two first electrode layers formed on a substrate and spaced apart from each other, semiconductor layers respectively formed on the first electrode layers, and a second electrode layer is integrally formed on the semiconductor layers to constitute Schottky barriers with the semiconductor layers.

According to the active matrix element of the present invention, since the two first electrode layers are directly formed on the substrate, the thickness of the first electrode can be minimized to obtain a flat pattern. In addition, the thicknesses of the first electrode layers are equal to each other. Adhesion strength of the first electrode layers directly formed on the substrate can be improved, thus satisfactorily preventing peeling or electrical disconnections.

The semiconductor layers are respectively formed on the first electrode layers, and the second electrode layer is integrally formed on the semiconductor layers. Therefore, a low-profile element can be obtained, and peeling of the respective layers constituting the element and damage such as electrical disconnections can be satisfactorily prevented, thereby realizing a highly reliable element. In addition, when the element is used as a switching element for driving, e.g., a liquid crystal cell, the alignment layers having uniform pretilt angles and/or alignment directions can be easily formed.

Furthermore, since a simple structure without a passivation layer can be used, the number of fabrication steps can be reduced, and the number of required masks can also be reduced. As a result, active matrix elements can be manufactured at a high yield, and productivity can be greatly improved.

DETAILED DESCRIPTION OF THE PREFERRED EMBODIMENTS

Figure 1:
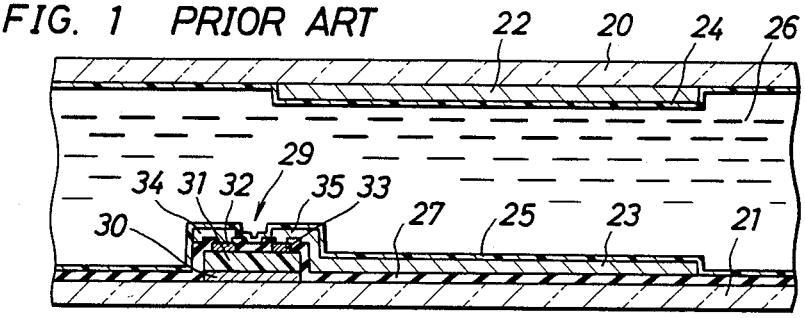
FIG. 1 is a sectional view of a conventional active matrix element applied to a liquid crystal cell.

A structure of an active matrix element will be described before a description of preferred embodiments of the present invention will be made with reference to the accompanying drawings.

According to the present invention, the active matrix element is basically formed as follows. Two first electrode layers are formed on a substrate and spaced apart from each other. Semiconductor layers are respectively formed on the first electrode layers. A second electrode layer is integrally formed on the semiconductor layers to form Schottky barriers with the semiconductor layers and is thus formed commonly for the pair of thin-film diodes. Therefore, an active matrix element of a pair of thin-film diodes connected in series and reverse-biased with each other is prepared.

The type of substrate is not limited to a specific one. Examples of the material for the substrate are soda glass, borosilicate glass, a high melting glass, quartz glass, "7059 glass" available from Corning Glass Works, and "Tenpax glass" available from Jener Corp. A substrate having a film such as an SiN or $SiO_2$ film may be used.

The first electrode may have a single-layered or multilayered structure. Materials for the first electrode layer and a layer portion which is brought into contact with the semiconductor layer formed thereon must be selected from materials which allow ohmic contact between the first electrode layer and the semiconductor layer or which allow formation of a small barrier. The height of the barrier must be smaller than that of the Schottky barrier formed between each semiconductor layer and the second electrode layer formed to bridge the semiconductor layers. The material for the first electrode layer may be selected from: a transparent conductive material such as ITO (indium-tin oxide), $SnO_2$ (stannic oxide), and ZnO (zinc oxide); a metal material such as chromium (Cr), nickel (Ni), Nichrome (Ni—Cr), aluminum (Al), molybdenum (Mo), and magnesium (Mg); and highly doped n-type amorphous silicon (i.e., n+a-Si:H) In particular, when a transparent conductive material is used, the pixel electrode lead layer can be advantageously formed integrally with the liquid crystal display pixel electrode layer in a single step.

The first layer may have a multilayered structure including two or more layers. Of the layers constituting a multilayered structure, a material for the layer portion contacting the surface of the substrate is selected from materials which allow good adhesion with the substrate. A material for the layer portion contacting the semiconductor layer is selected from materials which allow ohmic contact with the semiconductor layer or form a small barrier. The multilayered structure can provide an optimal function of an electrode and improve adhesion strength of the layer portion with respect to the substrate. As a result, peeling and electrical disconnections of the first electrode layer can be satisfactorily prevented.

Examples of the material for the first electrode layer are nickel (Ni), chromium (Cr), molybdenum (Mo), and tantalum (Ta). If a multilayered structure is to be formed with a material selected from these materials, the magnitude of stress must be taken into consideration. More specifically, examples of the multilayered structures are (1) a multilayered structure including a lower chromium layer portion and an upper molybdenum layer, (2) a multilayered structure including a lower nickel layer portion and an upper chromium layer portion, and (3) a multilayered structure including a lower chromium layer portion, an intermediate molybdenum layer portion, and an upper tantalum layer portion.

Materials for the multilayered structure of the first electrode layer are selected such that at least one layer portion of the structure is opaque. In this case, light incident from the substrate side is shielded by the opaque layer of the multilayered structure. Therefore, the advanced switching timing caused by optical degradation of the semiconductor layer formed on the corresponding first electrode layer can be properly controlled. Therefore, the effect of the present invention can be achieved when low-cost amorphous silicon is used to form the semiconductor layer.

Of the layer portions of the multilayered structure, at least one layer portion is preferably made of a transparent material. With this arrangement, the transparent layer portion can be formed together with the pixel electrode layer defining pixels in a single step. As a result, the number of patterning processes can be reduced, and productivity can be improved.

Materials for forming layer portions of the multilayered structure for the first electrode layer may be combinations of various conductive materials. The material for the transparent layer is selected from ITO (indium-tin oxide), $SnO_2$ (stannic oxide), and zinc oxide (ZnO). The material for the opaque layer portion can be selected from: a metal such as chromium (Cr), nickel (Ni), Nichrome (Ni—Cr), aluminum (Al), molybdenum (Mo); and highly doped n-type amorphous silicon (a+a-Si:H).

Examples of the multilayered structure of the first electrode layer are (1) a multilayered structure including an upper nickel layer portion, an intermediate chromium layer portion, and a lower ITO layer portion, (2) a multilayered structure including an upper layer portion of highly doped n-type amorphous silicon and a lower ITO layer portion, (3) a multilayered structure including an upper layer portion of highly doped n-type amorphous silicon, an intermediate chromium layer portion, and a lower ITO layer portion, (4) a multilayered structure of an upper nickel layer portion and a lower ITO layer portion, and (5) an upper ITO layer, and a lower nickel layer portion.

A means for forming layer portions of the first electrode layer is not limited to a specific one. Various thin-film formation techniques such as vacuum evaporation, electron beam evaporation, sputtering, and plasma CVD can be used. The thickness of the first electrode layer preferably falls within the range of 500Å to 1 $\mu$m and most preferably 500 to 3,000Å if the layer has a single-layered structure. However, if the first electrode layer has a multilayered structure, its thickness falls within the range of 1,000Å to 1 $\mu$m and more preferably 1,000 to 3,000Å. In this case, each layer portion preferably has a thickness of 500 to 2,000Å.

A material for forming the semiconductor layer is not limited to a specific one. Examples of such a material are un-doped amorphous silicon (a-Si:H), amorphous silicon (a-Si:H) doped with phosphorus (P) or arsenic (As), fluorinated amorphous silicon (a-Si:F:H), polysilicon (poly-Si), amorphous silicon carbide (a-SiC:H), amorphous silicon nitride (a-SiN:H), amorphous silicon-germanium (a-SiGe:H), tellurium (Te), and selenium (Se). The structure of the semiconductor layer is not limited to a specific one. For example, the semiconductor layer may comprise a single-layered structure of an i-type semiconductor layer or a multilayered structure of the combination of p- or n-type and i-type semiconductor layers. The conductivity of the lower layer portion of the semiconductor layer on the first electrode layer side is set to be lower than that of the upper layer portion thereof on the second electrode side. Under this condition, when the electrode is turned off, a leakage current flowing from one first electrode layer to the other electrode layer through the semiconductor layers can be reduced. As a result, the electrode can be optimally switched while the thickness of the semiconductor layers can be set enough to prevent disconnections or the like. Such a semiconductor layer can be prepared as follows:

(1) two or more layer portions having different conductivities are stacked to decrease the conductivity of the lower portion of the semiconductor layer on the first electrode layer side and to increase the conductivity of the upper portion of the semiconductor layer on the second electrode layer side; and (2) the materials are properly changed during formation of the semiconductor layer to provide a conductivity gradient declined from the upper layer portion of the semiconductor layer on the second electrode layer to the lower layer portion thereof on the first electrode layer side.

The material for the semiconductor layer is not limited to a specific one. Examples of the material having a low conductivity are un-doped amorphous silicon (a-Si:H), polysilicon (poly-Si), fluorinated amorphous silicon (a-Si:F:H), amorphous silicon-germanium (a-SiGe:H), amorphous silicon nitride (a-SiN:H), amorphous silicon carbide (a-SiC:H), and amorphous germanium carbide (a-GeC:H). Examples of the material having a high conductivity are amorphous silicon (a-Si:H) doped with an impurity such as phosphorus (P) or arsenic (As), amorphous silicon-germanium (a-SiGe:H), amorphous silicon carbide (a-SiC:H), tellurium (Te), selenium (Se), polysilicon (poly-Si), and microcrystal silicon ($\mu$C—Si).

Various thin-film formation techniques can be used to form semiconductor layers. More specifically, techniques such as plasma CVD (chemical vapor deposition), thermal CVD (chemical vapor deposition), vacuum evaporation, sputtering, and ion plating may be preferably used.

For example, when plasma CVD is used to form a semiconductor layer, a gas such as $SiH_4$ or $PH_3$ containing silicon, hydrogen and phosphorus atoms is used as a major constituent in a source gas. In addition, a gas such as $N_2$, $NH_3$, or $SiF_4$ gas containing hydrogen or fluorine atoms may be added to the above major constituent. A diluting gas such as argon gas or hydrogen gas may be used as a carrier gas.

The thickness of the semiconductor layer is not limited to a specific value. However, the thickness preferably falls within the range of 1,000Å to 2 $\mu$m and most preferably 3,000Å to 1 $\mu$m. If the semiconductor layer has a multilayered structure of layer portions having different conductivities, the thickness of the layer portion having a low conductivity preferably falls within the range of 500Å to 1.9 $\mu$m.

Assume that at least one of the pair of first electrode layers serves as a scanning electrode, and at least the other one serves as a pixel electrode lead layer having the same width as that of the scanning electrode. In this case, a semiconductor layer may be formed to cover entire surfaces of the scanning electrode layer and the pixel electrode lead layer in the widthwise directions thereof.

More specifically, the scanning electrode and pixel electrode lead layer which constitute the first electrode layers have identical widths, and the semiconductor layers and the second electrode layer extend to cover the entire areas of the scanning electrode layer and the pixel electrode lead layer at least along the widthwise directions thereof. The contact area between the semiconductor layer and the scanning electrode layer is equal to that between the semiconductor layer and the pixel electrode lead layer. As a result, symmetry of the pair of thin-film diodes connected in series and reverse-biased with each other can be greatly improved. When the element is used as a switching element for driving a liquid crystal cell, deterioration of the liquid crystal layer in the initial period can be prevented.

The second electrode layer is formed on the semiconductor layers so as to form Schottky barriers with the semiconductor layers. Examples of the material for forming the second electrode layer are platinum (Pt), gold (Au), palladium (Pd), tungsten (W), rhodium (Rh), titanium (Ti), molybdenum (Mo), iridium (Ir), chromium (Cr), nickel (Ni,) and Nichrome (Ni—Cr). These materials may contain a small amount of impurity.

The second electrode layer can be formed by various thin-film formation techniques, and the technique for forming the second electrode layer is not limited to a specific one. However, electron beam evaporation, sputtering, or the like is preferable.

The thickness of the second electrode is not limited to a specific value. The thickness preferably falls within the range of 50 to 5,000Å and more preferably 100 to 500Å.

Although the method of manufacturing an active matrix element according to the present invention is not limited to a specific method, the following method can be effectively utilized.

<Step (1)>

Transparent conductive layer serving as a pixel electrode lead layer and a scanning electrode layer are formed on a substrate. The transparent conductive layers can be formed together with the display pixel electrode layer constituting liquid crystal cells in a single step. The pixel electrode layer and the pixel electrode lead layer may be simultaneously formed, thereby further decreasing the number of steps.

Subsequently, a metal layer is formed to cover the entire surface of the transparent conductive layer.

Step <(21)>

A semiconductor layer is formed on an element formation region including a metal layer associated with the pixel electrode lead layer and a metal layer associated with the scanning electrode layer.

A second electrode layer is formed to cover the entire surface of the semiconductor layer.

The resultant structure is patterned to leave the semiconductor layer and the second electrode layer in only the element formation region.

Step <(3)>

The metal layer, i.e., the exposed metal layer formed on the transparent conductive layer is etched using the residual second electrode layer and the residual semiconductor, both of which are formed in step (2), as masks.

The exposed metal layer can be etched using, e.g., a cerium nitrate ammonium salt (($NH_4)_2Ce(NO_3)_6$).

By steps (1) through (3), prepared is an active matrix element of a pair of thin-film diode connected in series and reverse-biased with each other.

Since the second electrode and semiconductor layers left in step (2) are used as masks to etch the exposed metal layer in step (3), a particular mask is not required to pattern the metal layer. Therefore, formation of a photoresist pattern and light radiation can be omitted, thereby reducing the number of steps.

The pixel electrode lead layer and the scanning electrode layer constitute a multilayered structure of metal and transparent conductive layers. The transparent conductive layer can be formed together with the pixel electrode layer constituting the liquid crystal cells. As a result, the number of patterning steps can be reduced, and productivity can be greatly improved.

Another method may be utilized as follows:

Step <(1)>

A first electrode layer thin film is formed on a substrate and is patterned to form two first electrode layers having predetermined shapes. One first electrode layer serves as the scanning electrode layer, and the other first electrode layer serves as the pixel electrode lead layer.

Subsequently, a pixel electrode layer thin film of a transparent conductive layer is formed and is patterned to form a pixel electrode layer having a predetermined shape. The end portion of the pixel electrode is formed so that it is overlapped with other first electrode layer serving as the pixel electrode lead layer and is electrically connected thereto.

Step <(2)>

A semiconductor thin film is formed on an element formation region including two first electrode layers.

Step <(3)>

A second electrode layer thin film is formed on the semiconductor thin film. The second electrode layer thin film is patterned by etching or a lift-off method to leave the thin film in only the element formation region, thereby forming a second electrode layer having a predetermined shape.

Patterning of the second electrode thin film is preferably performed by the lift-off method. According to the lift-off method, a metal such as platinum substantially free from etching can be used as a material for the second electrode layer, thereby forming the second electrode layer having stable chemical properties and good electrical characteristics.

Step <(4)>

The semiconductor thin film is patterned using the second electrode layer as a mask formed in step (3) to etch the exposed portion of the thin film, thereby obtaining semiconductor layers.

By steps (1) through (4), prepared is an active matrix element of a pair of thin-film diodes connected in series and reverse-biased with each other.

In step (4), the semiconductor thin film is patterned using the second electrode layer as a mask to obtain the semiconductor layers. A special mask is not required for patterning the semiconductor thin film. The number of steps can be reduced. At the same time, the second electrode layer and the semiconductor layers can be formed with high precision in a self-aligned manner. Therefore, a high-performance active matrix element can be formed.

The present invention will be described with reference to the accompanying drawings.

Figure 3A:
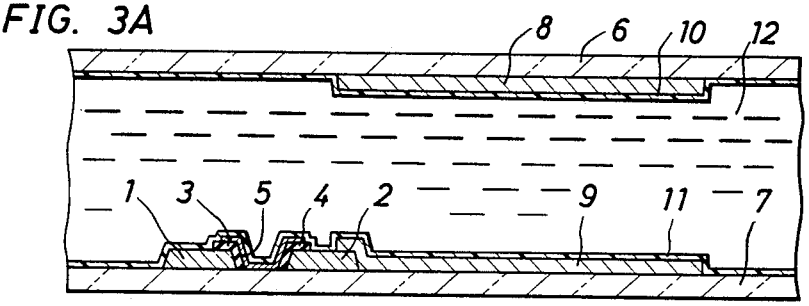
FIG. 3A is a sectional view showing a structure of an active matrix element employed in a liquid crystal cell according to a first embodiment of the present invention.
Figure 3B:
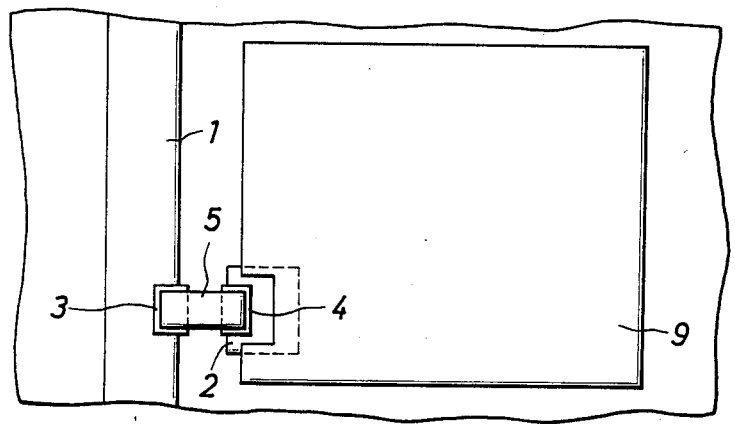
FIG. 3B is a plane view showing part of the active matrix element shown in FIG. 3A.

FIGS. 3A and 3B show an active matrix element used in a liquid crystal cell according to a first embodiment of the present invention. Referring to FIGS. 3A and 3B, reference numerals 1 and 2 denote first electrode layers; 3 and 4, semiconductor layers; 5, a second electrode layer, 6, an upper substrate; 7, a lower substrate, 8, a counter electrode layer; 9, a pixel electrode layer; 10 and 11, alignment layers; and 12, a liquid crystal layer.

In the first embodiment, the strip-like first electrode layer 1 serving as a scanning electrode is formed on the lower substrate 7, and the small first electrode layer 2 serving as an electrode connected to the pixel electrode layer 9 is formed on the lower substrate 7 and is spaced apart from the first electrode layer 1.

The semiconductor layer 3 is formed on the first electrode layer 1, and the semiconductor layer 4 is formed on the first electrode layer 2. These semiconductor layers 3 and 4 are spaced apart from each other, and extend and are so bent as to cover the opposite side portions of the first electrode layers 1 and 2.

The second electrode layer 5 is formed on the semiconductor layers 3 and 4 so as to cover opposite ends thereof, i.e., to bridge the opposite end portions of the semiconductor layers 3 and 4. One end of the second electrode layer 5 is located on the semiconductor layer 3, and the other end thereof is formed on the semiconductor layer 4. The central portion of the second electrode layer 5 covers the bent semiconductor layer portions and is in direct contact with the lower substrate 7.

Figure 4A:
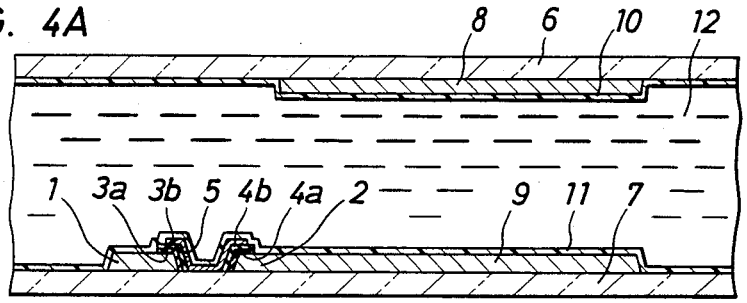
FIG. 4A is a sectional view showing a structure of an active matrix element employed in a liquid crystal cell according to a second embodiment of the present invention.
Figure 4B:
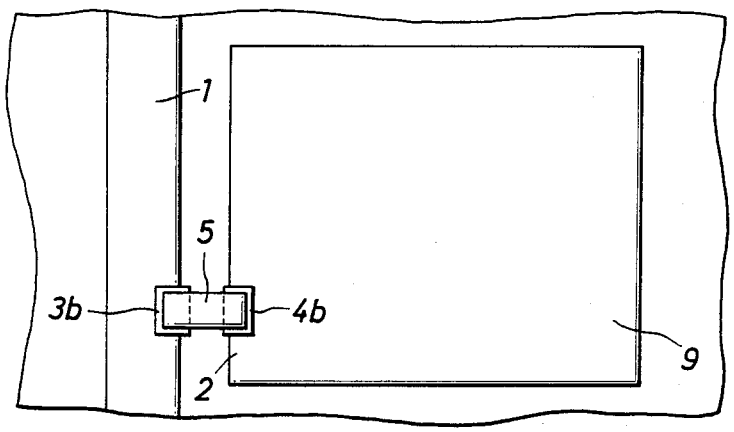
FIG. 4B is a plane view showing part of the active matrix element shown in FIG. 4A.

FIGS. 4A and 4B show an active matrix element used in a liquid crystal cell according to a second embodiment of the present invention. The active matrix element in the second embodiment is substantially the same as that in the first embodiment, except that the first electrode layer 2 (FIG. 3A and 3B) and the pixel electrode layer 9 (FIGS. 3A and 3B) are formed by a common layer, and that each of the semiconductor layers 3 and 4 has a two-layered structure.

In the second embodiment, a strip-like first electrode layer 1 serving as a scanning electrode is formed on a lower substrate 7. A large rectangular first electrode layer 2 also serving as the pixel electrode layer is also formed on the lower electrode 7 and is spaced apart from the first electrode layer 1.

A semiconductor layer 3 is formed on the first electrode layer 1, and a semiconductor layer 4 is formed on the first electrode layer 2. The semiconductor layers 3 and 4 comprise sub semiconductor layers 3a and 4a which ohmically contact the first electrode layers 1 and 2 and main semiconductor layers 3b and 4b stacked on the sub semiconductor layers 3a and 4a, respectively.

Figure 5:
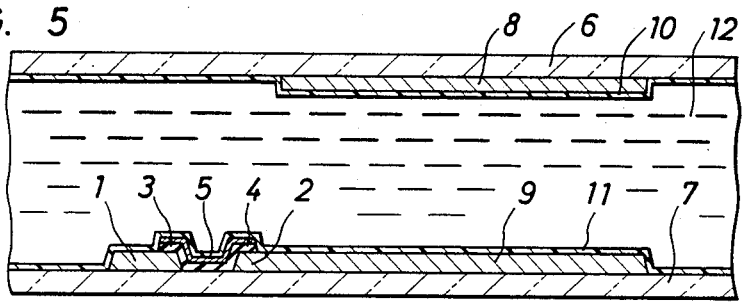
FIG. 5 is a sectional view showing a structure of an active matrix element employed in a liquid crystal cell according to a third embodiment of the present invention.

FIG. 5 shows an active matrix element used in a liquid crystal cell according to a third embodiment of the present invention. The active matrix element in the third embodiment is substantially the same as that in the first embodiment of FIGS. 3A and 3B, except that the first electrode layer 2 (FIG. 3A and 3B) and the pixel electrode layer 9 (FIGS. 3A and 3B) are formed by a common layer, and that the semiconductor layers are integrally formed.

In the third embodiment, a strip-like first electrode layer 1 serving as a scanning electrode is formed on a lower substrate 7. A large rectangular first electrode layer 2 also serving as the pixel electrode layer is also formed on the lower electrode 7 and is spaced apart from the first electrode layer 1.

A semiconductor layer 3 formed on the first electrode layer 1 is continuous with a semiconductor layer 4 formed on the first electrode layer 2.

Figure 6A:
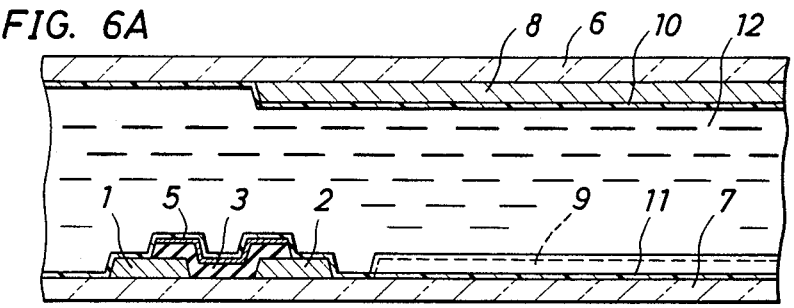
FIG. 6A is a sectional view showing a structure of an active matrix element employed in a liquid crystal cell according to a fourth embodiment of the present invention.
Figure 6B:
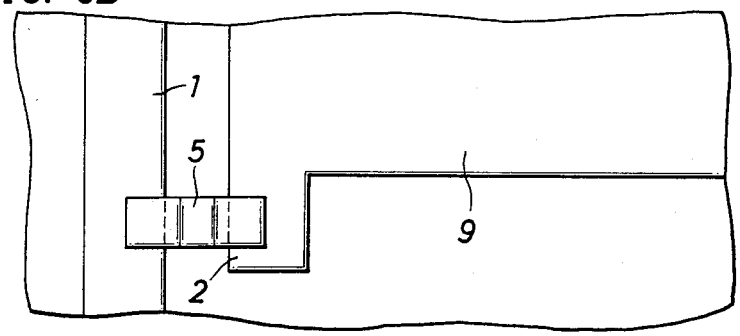
FIG. 6B is a plane view showing part of the active matrix element shown in FIG. 6A.

FIGS. 6A and 6B show an active matrix element used in a liquid crystal cell according to a fourth embodiment of the present invention. Referring to FIGS. 6A and 6B, reference numerals 1 and 2 denote a scanning electrode layer and an electrode layer for pixel electrode which serve as first electrode layers; 3, a semiconductor layer; 5, a second electrode layer; 6, an upper substrate; 7, a lower substrate; 8, a counter electrode layer; 9, a pixel electrode layer; 10 and 11, alignment layers; and 12, a liquid crystal layer.

In the fourth embodiment, the strip-like scanning electrode layer 1 and the electrode layer 2 for pixel electrode are simultaneously formed on the lower substrate 7 in a single step. The scanning electrode layer 1 is spaced apart from the electrode layer 2. The electrode layer 2 is integrally formed with the pixel electrode layer 9. Therefore, the scanning electrode layer 1, the electrode layer 2, and the pixel electrode layer 9 are simultaneously formed in the single step.

The semiconductor layer 3 is formed on the scanning electrode layer 1 and the electrode layer 2 for the pixel electrode 9, and the second electrode layer 5 is formed on the semiconductor layer 3.

Figure 7A:
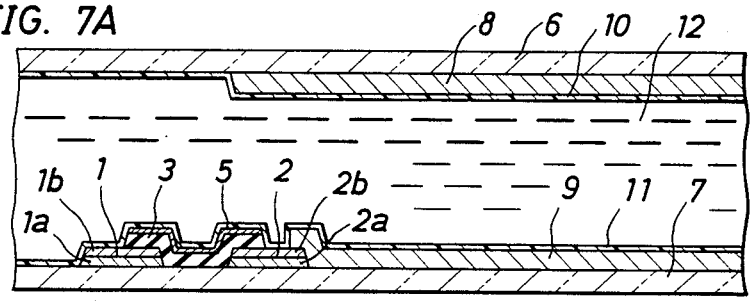
FIG. 7A is a sectional view showing a structure of an active matrix element employed in a liquid crystal cell according to a fifth embodiment of the present invention.
Figure 7B:
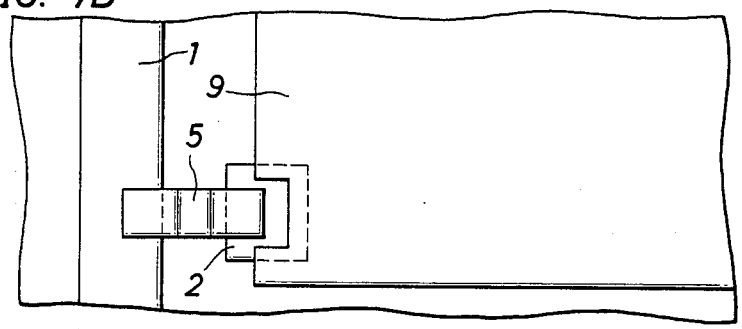
FIG. 7B is a plane view showing part of the active matrix element shown in FIG. 7A.

FIGS. 7A and 7B show an active matrix element in a liquid crystal cell according to a fifth embodiment of the present invention. Referring to FIGS. 7A and 7B, reference numerals 1 and 2 denote first electrode layers; 3, a semiconductor layer; 5, a second electrode layer; 6, an upper substrate; 7, a lower substrate; 8, a counter electrode layer; 9, a pixel electrode layer; 10 and 11, alignment layers; and 12, a liquid crystal layer.

In this embodiment, the strip-like first electrode layer 1 serving as a scanning electrode is formed on the lower substrate 7, and the first electrode layer 2 serving as an pixel electrode lead layer is formed thereon at a position away from the first electrode layer 1.

The first electrode layer 1 has a two-layered structure of a lower layer portion 1a and an upper layer portion 1b, and the first electrode layer 2 also has a two-layered structure of a lower layer portion 2a and an upper layer portion 2b.

The semiconductor layer 3 is formed on the first electrode layers 1 and 2. A second electrode layer 5 is formed on the semiconductor layer 3. The semiconductor layer 3 may be divided into two regions respectively formed on the first electrode layers 1 and 2.

Figure 8A:
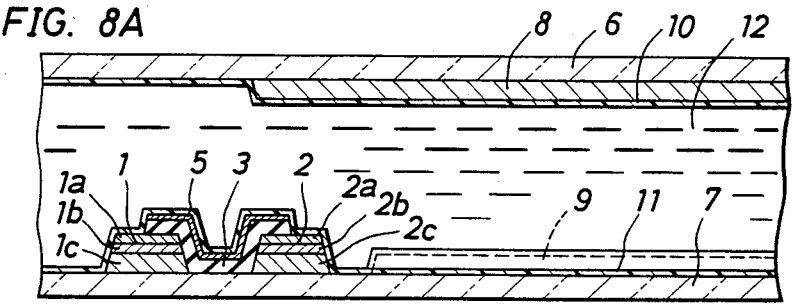
FIG. 8A is a sectional view showing a structure of an active matrix element employed in a liquid crystal cell according to a sixth embodiment of the present invention.
Figure 8B:
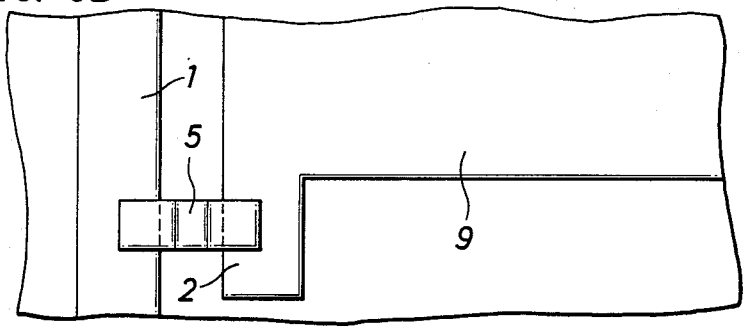
FIG. 8B is a plane view showing part of the active matrix element shown in FIG. 8A.

FIGS. 8A and 8B show a display device active matrix element used in a liquid crystal cell according to a sixth embodiment of the present invention. Referring to FIG. 8A and 8B, reference numerals 1 and 2 denote first electrode layers; 3, a semiconductor layer; 5, a second electrode layer; 6, an upper substrate; 7, a lower substrate; 8, a counter electrode layer; 9, a pixel electrode layer; 10 and 11, alignment layers; and 12, a liquid crystal layer.

In this embodiment, the strip-like first electrode layer 1 serving as a scanning electrode is formed on the lower substrate 7, and the first electrode layer 2 serving as the pixel electrode lead layer is formed thereon at a position away from the first electrode layer 1.

The first electrode layer 1 has a three-layered structure of an upper layer portion 1a, an intermediate layer portion 1b, and a lower layer portion 1c, and the first electrode layer 2 has a three-layered structure of an upper layer portion 2a, an intermediate layer portion 2b, and a lower layer portion 2c.

In this embodiment, the upper layer portions 1a and 2a respectively comprise opaque layers of highly doped n-type amorphous silicon. The intermediate layer portions 1b and 2b respectively comprise chromium opaque layers, and the lower layer portions 1c and 2c respectively comprise ITO transparent layers. The lower layer portions 1c and 2c as the transparent layers can be simultaneously formed with the pixel electrode layer 9 defining the pixels in a single step.

The semiconductor layer 3 is integrally formed on the first electrode layers 1 and 2. The second electrode layer 5 is formed on the semiconductor layer 3. The semiconductor layer 3 may be divided into two regions respectively formed on the first electrode layers 1 and 2.

Figure 9A:
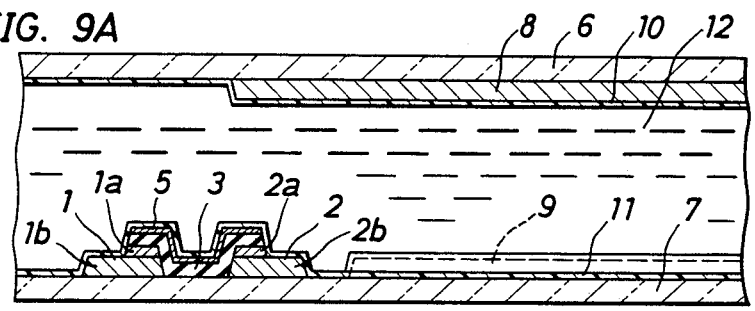
FIG. 9A is a sectional view showing a structure of an active matrix element employed in a liquid crystal cell according to a seventh embodiment of the present invention.
Figure 9B:
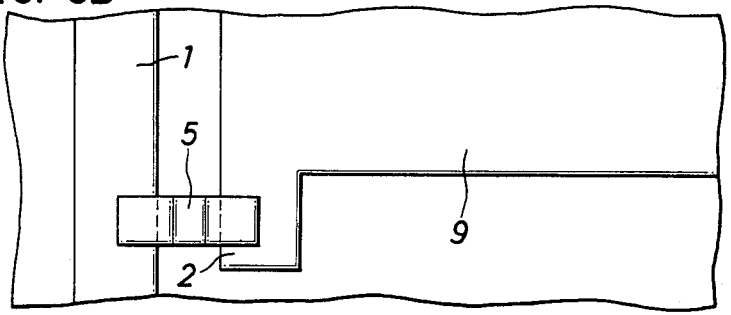
FIG. 9B is a plane view showing part of the active matrix element shown in FIG. 9A.

FIGS. 9A and 9B show an active matrix element used in a liquid crystal cell according to a seventh embodiment of the present invention. Referring to FIGS. 9A and 9B, reference numerals 1 and 2 denote scanning electrode and pixel electrode lead layers serving as first electrode layers; 3, a semiconductor layer; 5, a second electrode layer; 6, an upper substrate; 7, a lower substrate; 8, a counter electrode layer; 9, a pixel electrode layer; 10 and 11, alignment layers; and 12, a liquid crystal layer.

In this embodiment, the strip-like scanning electrode layer 1 is formed on the lower substrate 7, and the pixel electrode lead layer 2 is formed thereon at a position away from the scanning electrode layer 1.

The scanning electrode layer 1 has a two-layered structure of an upper metal layer 1a and a lower transparent conductive layer 1b. The pixel electrode lead layer 2 has a two-layered structure of an upper metal layer 2a and a lower transparent conductive layer 2b. The transparent layers 1b and 2b are formed together with the pixel electrode layer 9 in a single step.

The semiconductor layer 3 is integrally formed on the scanning electrode and pixel electrode lead layers 1 and 2. The second electrode layer 5 is formed on the semiconductor layer 3. The semiconductor layer 3 may be divided into two regions respectively formed on the scanning electrode and pixel electrode lead layers 1 and 2.

Figure 10A:
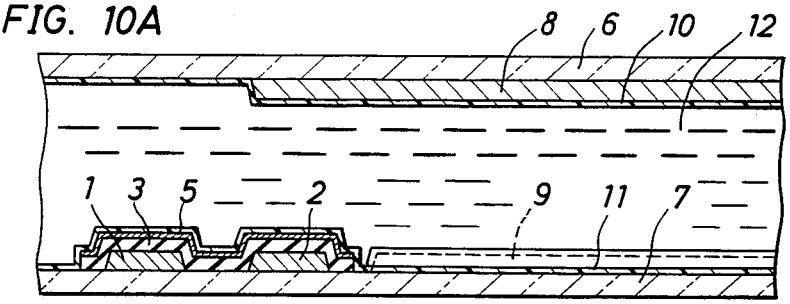
FIG. 10A is a sectional view showing a structure of an active matrix element employed in a liquid crystal cell according to an eighth embodiment of the present invention.
Figure 10B:
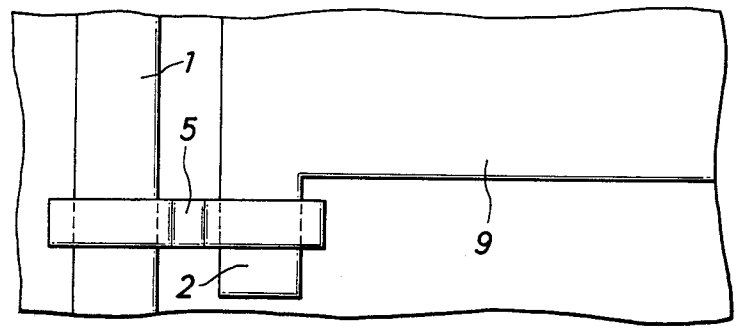
FIG. 10B is a plane view showing part of the active matrix element shown in FIG. 10A.

FIGS. 10A and 10B show an active matrix element used in a liquid crystal cell according to an eighth embodiment of the present invention. Referring to FIGS. 10A and 10B, reference numeral 1 and 2 denote scanning electrode and pixel electrode lead layers serving as first electrode layers; 3, a semiconductor layer; 5, a second electrode layer; 6, an upper substrate; 7, a lower substrate; 8, a counter electrode layer; 9, a pixel electrode layer; 10 and 11, alignment layers; and 12, a liquid crystal layer 12.

In this embodiment, the strip-like scanning electrode layer 1 is formed on the lower substrate 7, and the pixel electrode lead layer 2 is formed thereon at a position away from the scanning electrode layer 1. The width of the scanning electrode layer 1 is the same as that of the pixel electrode lead layer 2. The pixel electrode lead layer 2 is simultaneously with the pixel electrode layer 9.

The semiconductor layer 3 is formed on the scanning electrode layer 1 and the pixel electrode lead layer 2 so as to entirely cover the layers 1 and 2 in the widthwise direction. The second electrode layer 5 is formed on the semiconductor layer 3. The semiconductor layer 3 may be divided into two regions respectively formed on the scanning electrode and pixel electrode lead layers 1 and 2.

Figure 11A:
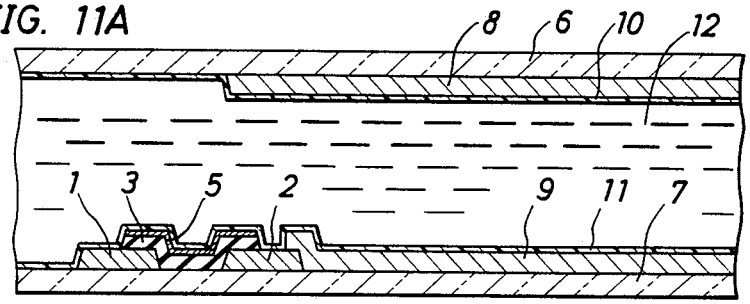
FIG. 11A is a sectional view showing a structure of an active matrix element employed in a liquid crystal cell according to a ninth embodiment of the present invention.
Figure 11B:
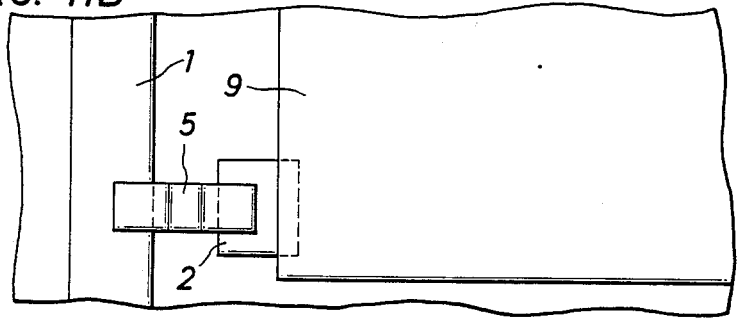
FIG. 11B is a plane view showing part of the active matrix element shown in FIG. 11A.

FIGS. 11A and 11B show an active matrix element manufactured by the method of the present invention and used in a liquid crystal cell according to a ninth embodiment of the present invention. Referring to FIGS. 11A and 11B, reference numerals 1 and 2 denote first electrode layers; 3, a semiconductor layer; 5, a second electrode layer; 6, an upper substrate; 7, a lower substrate; 8, a counter electrode layer; 9, a pixel electrode layer; 10 and 11, alignment layers; and 12, a liquid crystal layer.

In this embodiment, the strip-like first electrode layer 1 serving as a scanning electrode layer is formed on the lower substrate 7, and the first electrode layer 2 serving as a pixel electrode lead layer is formed thereon at a position away from the first electrode layer 1.

The semiconductor layer 3 is integrally formed on the first electrode layers 1 and 2. The second electrode layer 5 is formed on the semiconductor layer 3. The semiconductor layer 3 may be divided into two regions respectively formed on the first electrode layers 1 and 2.

Figure 12A:
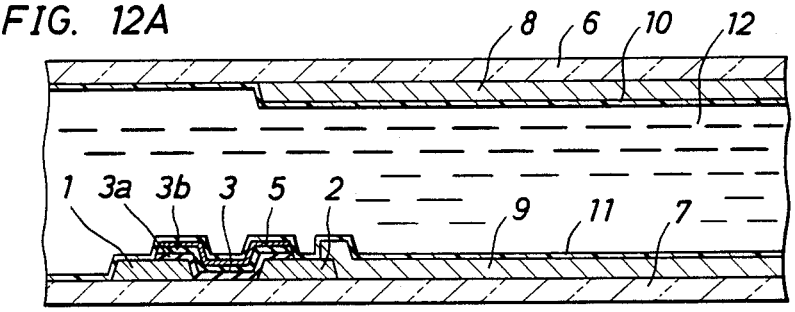
FIG. 12A is a sectional view showing a structure of an active matrix element employed in a liquid crystal cell according to a tenth embodiment of the present invention.
Figure 12B:
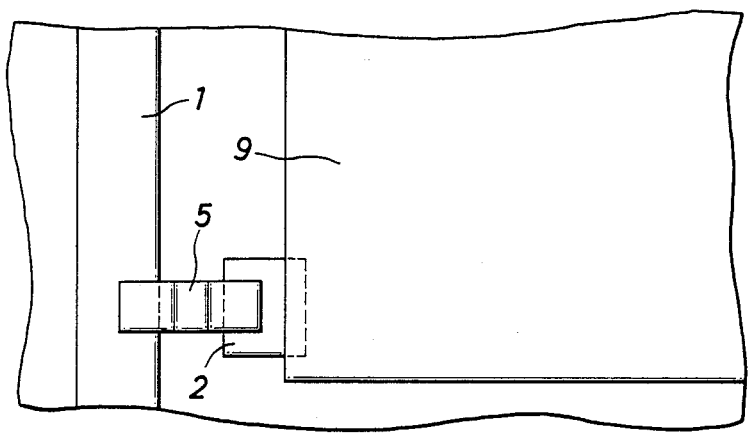
FIG. 12B is a plane view showing part of the active matrix element shown in FIG. 12A.

FIGS. 12A and 12B show an active matrix element used in a liquid crystal cell according to a tenth embodiment of the present invention. Referring to FIGS. 12A and 12B, reference numerals 1 and 2 denote first electrode layers; 3, a semiconductor layer; 5, a second electrode layer; 6, an upper substrate; 7, a lower substrate; 8, a counter electrode layer; 9, a pixel electrode layer; 10 and 11, alignment layers; and 12, a liquid crystal layer.

In this embodiment, the strip-like first electrode layer 1 serving as a scanning electrode is formed on the lower substrate 7, and the first electrode layer 2 serving as a pixel electrode lead layer is formed thereon at a position away from the first electrode layer 1.

The semiconductor layer 3 is integrally formed on the first electrode layers 1 and 2, and the second electrode layer 5 is formed on the semiconductor layer 3.

The semiconductor layer 3 has a two-layered structure of a lower layer portion 3a having a low conductivity on the first electrode layer side and an upper layer portion 3b having a high conductivity on the second electrode layer side.

The material of the liquid crystal layer 12 is not limited to a specific one. Manufacturing Examples of the material are a nematic liquid crystal, a chiral nematic liquid crystal, a cholesteric liquid crystal, a smectic liquid crystal, a chiral smectic liquid crystal, other known liquid crystals, and a combination thereof. The liquid crystal display modes include a twist nematic (TN) mode, a guest-host (GH) mode, an electrically controlled birefringence (ECB) mode, a cholesteric-nematic phase transition mode, and a dynamic scattering (DS) mode. Any mode can be used in the present invention.

The material for the counter electrode layer 8 and the pixel electrode layer 9 is preferably ITO (tin-indium oxide).

The alignment layers 10 and 11 can be formed by any known method. The known methods are: a method in which an evaporation material such as SiO, MgO, or $MgF_2$ is obliquely evaporated on the surface of the substrate to form an alignment layer; a method in which a film of a polyimide, polyamide, polyvinyl alcohol, or phenoxy polymer is formed on the surface of the substrate, and the surface of the coating is rubbed with cotton cloth, vinylon cloth, Tetoron cloth, or absorbent cotton to form grooves on the surface of the substrate in a predetermined direction according to rubbing, thereby forming an alignment layer; a method in which a chromium carboxylate complex, an organic silane compound, or the like is coated or formed by plasma polymerization or the like on the surface of the substrate, and liquid crystal molecules are aligned on the substrate by chemical adsorption; and the like.

The active matrix element of the present invention can be preferably used in a liquid crystal cell and in a matrix type display element including display elements such as an EL and an EC.

The present invention will be described in detail by way of its manufacturing examples but is not limited thereto.

<MANUFACTURING EXAMPLE 1>

One thousand liquid crystal cells each having the active matrix element of FIGS. 3A and 3B were prepared in steps (1) through (6) below.

(1) Formation of First Electrode Layers

A 3,000Å thick chromium (Cr) film was formed on a glass substrate by sputtering and was patterned by taper etching using a first mask, thereby forming a strip-like first electrode having a width of 40 μm and a square first electrode layer having dimensions of 500 μm and 500 μm.

(2) Formation of Pixel Electrode Layer

A 3,000Å thick ITO (indium-tin oxide) film was formed on a glass substrate by sputtering, a photoresist film was formed thereon and patterned using a second mask, and the ITO film was then patterned to form a square pixel electrode having dimensions of 500 μm×500 μm.

(3) Formation of Semiconductor Layer

An 8,000Å thick semiconductor thin film of phosphorus-doped amorphous silicon was formed on the first electrode layers by plasma CVD under the following conditions and was patterned using a third mask, thereby forming two semiconductor layers respectively formed on the first electrode layers.

Conditions:
Gas Pressure: 0.3 Torr
Substrate Temperature: 220° C.
RF (13.56 MHz) Power: 10 W
Reaction Gas and Flow Rate:
    $PH_3$—$SiH_4$ Gas Mixture: 10 sccm
    (concentration ratio of $PH_3$ to $SiH_4$,
    i.e., $PH_3/SiH_4$: 200 ppm (volume ratio))
    Ar Gas: 90 sccm (4) Formation of Second Electrode Layer A 500Å thick platinum (Pt) film was formed on the semiconductor layers by electron beam evaporation and was patterned by a lift-off method using the third mask, thereby forming a second electrode layer.

(5) Annealing

An element prepared by steps (1) through (4) was annealed in a vacuum of $5 \times 10^{-6}$ Torr at a temperature of 200° C. for 30 minutes.

(6) Formation of Orientation Layer

An SiO was used as an evaporation material for oblique evaporation to form alignment layers each having an average thickness of 2,000Å.

One thousand liquid crystal cells prepared by steps (1) through (6) were used to arrange a liquid crystal display device, and the device was driven to measure a percentage of defective liquid crystal cells with respect to 1,000 liquid crystal cells. A good liquid crystal cell is defined as the one having a practically satisfactory contrast ratio and alignment angle uniformity. A defective liquid crystal cell is defined as the one having alignment angle nonuniformity although its contrast ratio is practically satisfactory, or the one having defective pixels caused by peeling or electrical disconnections of the layers constituting the active matrix element.

The percentage of defective liquid crystal cells was 20%, and it was found that active matrix elements could be simply manufactured at a high yield according to the constitution of the present invention.

<MANUFACTURING EXAMPLE 2>

One thousand liquid crystal cells each having the active matrix element shown in FIGS. 4A and 4B were prepared by steps (1) through (5) as follows:

(1) Formation of First Electrode Layers

A 3,000Å thick ITO (indium-tin oxide) was formed on a glass substrate by sputtering and was patterned by taper etching using a first mask and a photoresist method, thereby forming a strip-like first electrode layer having a width of 40 μm and a square first electrode layer having dimensions of 500 μm×500 μm and serving as a pixel electrode.

(2) Formation of Semiconductor Layer (i) Formation of Sub Semiconductor Layer

A 500Å thick sub semiconductor layer of a phosphorus-doped n+-type amorphous semiconductor was formed on the first electrode layers of plasma CVD under the following conditions:

Conditions:
Gas Pressure: 0.3 Torr
Substrate Temperature: 220° C.
RF (13.56 MHz) Power: 10 W
Reaction Gas and Flow Rate:
    $PH_3$—$SiH_4$ Gas Mixture: 10 sccm
    (concentration ratio of $PH_3$ to $SiH_4$,
    i.e., $PH_3/SiH_4$: 1% (volume ratio))
    Ar Gas: 90 sccm (ii) Formation of Main Semiconductor Layer An 8,000Å thick main semiconductor layer of phosphorus-doped n+-type amorphous silicon was formed on the sub semiconductor layer by plasma CVD under the following conditions:

Conditions:
Gas Pressure: 0.3 Torr
Substrate Temperature: 220° C.
Reaction Gas and Flow Rate:
    $PH_3$—$SiH_4$ Gas Mixture: 10 sccm
    (concentration ratio of $PH_3$ to $SiH_4$,
    i.e., $PH_3/SiH_4$ 200 ppm (volume ratio))
    Ar Gas: 90 sccm (iii) Patterning The sub and main semiconductor layers were patterned using a second mask to form two independent semiconductor layers each having a two-layered structure.

(3) Formation of Second Electrode Layer

A 300Å thick platinum (Pt) film was formed on the semiconductor layers by electron beam evaporation and was patterned by a lift-off method using the third mask, thereby forming a second electrode layer.

(4) Annealing

An element prepared by steps (1) through (3) was annealed in a vacuum of $5 \times 10^{-6}$ Torr at a temperature of 200° C. for 30 minutes. (5) Formation of Orientation Layer An SiO was used as an evaporation material for oblique evaporation to form alignment layers each having an average thickness of 2,000Å.

Following the same procedures as in Manufacturing Example 1, 1,000 liquid crystals prepared by steps (1) through (5) were used to arrange a liquid crystal display device, and the device was driven to measure a percentage of defective liquid crystal cells with respect to 1,000 liquid crystal cells.

The percentage of defective liquid crystal cells was 15%, and it was found that active matrix elements could be simply manufactured at a high yield according to the constitution of the present invention.

<MANUFACTURING EXAMPLE 3>

One thousand liquid crystal cells each having the active matrix element shown in FIG. 5 were prepared by steps (1) through (5) as follows:

(1) Formation of First Electrode Layers

A 3,000Å thick ITO (tin-indium oxide) was formed on a glass substrate by sputtering and was patterned by taper etching using a first mask and a photoresist method, thereby forming a strip-like first electrode layer having a width of 40 μm and a square first electrode layer having dimensions of 500 μm × 500 μm and serving as a pixel electrode.

(2) Formation of Semiconductor Layer

An 8,000Å thick continuous film of amorphous silicon was formed on the first electrode layers by plasma CVD under the following conditions:
Conditions:
Gas Pressure: 0.3 Torr
Substrate Temperature: 220° C.
RF (13.56 MHz) Power: 10 W
Reaction Gas and Flow Rate:
SiH$_4$: 10 sccm
Ar: 90 sccm (3) Formation of Second Electrode Layer A 1,000Å thick chromium (Cr) film was formed on the semiconductor layer by electron beam evaporation.
(4) Patterning The semiconductor layer and the second electrode layers were patterned by continuous etching using a second mask, thereby forming a semiconductor layer pattern and a second electrode layer pattern in a predetermined shape.

(5) Formation of Orientation Layer

An SiO was used as an evaporation material for oblique evaporation to form alignment layers each having an average thickness of 2,000Å.

Following the same procedures as in Manufacturing Example 1, 1,000 liquid crystals prepared by steps (1) through (5) were used to arrange a liquid crystal display device, and the device was driven to measure a percentage of defective liquid crystal cells with respect to 1,000 liquid crystal cells.

The percentage of defective liquid crystal cells was 30%, and it was found that active matrix elements could be simply manufactured at a high yield according to the constitution of the present invention.

<COMPARATIVE EXAMPLE 1>

One thousand liquid crystal cells each having the active matrix element shown in FIG. 1 were prepared by steps (1) through (8) below.

(1) Formation of Conductive Layer

A 3,000Å thick conductive layer of phosphorus-doped n$^+$-type amorphous silicon was formed on a glass substrate by plasma CVD under the following Conditions:
Conditions
Gas Pressure: 0.3 Torr
Substrate Temperature: 220° C.
RF (13.56 MHz) Power: 10 W
Reaction Gas and Flow Rate:
PH$_3$—SiH$_4$ Gas Mixture: 10 sccm
(concentration ratio of PH$_3$ to SiH$_4$, i.e., PH$_3$/SiH$_4$: 1% (volume ratio))
Ar: 90 sccm (2) Formation of Semiconductor Layer An 8,000Å thick semiconductor layer of phosphorus-doped n$^+$-type amorphous silicon was formed on the conductive layer by plasma CVD under the following Conditions:
Conditions
Gas Pressure: 0.3 Torr
Substrate Temperature: 220° C.
RF (13.56 MHz) Power: 10 W
Reaction Gas and Flow Rate:
PH$_3$—SiH$_4$ Gas Mixture: 10 sccm
(concentration ratio of PH$_3$ to SiH$_4$, i.e., PH$_3$/SiH$_4$ 200 ppm (volume ratio))
Ar: 90 sccm (3) Formation of Metal Layer for Forming Schottky Barrier A 500Å thick platinum (Pt) film was formed on the semiconductor layer by electron beam evaporation and was patterned using a first mask by a lift-off method, thereby forming a metal layer for forming a pair of Schottky (4) Annealing An element prepared by steps (1) through (3) was annealed in a vacuum of about $5 \times 10^{-6}$ Torr at a temperature of 200° C. for 30 minutes.

(5) Patterning

The conductive layer and the semiconductor layer were patterned using a second mask to form conductive and semiconductor layers having a predetermined size.

(6) Formation of Passivation Layer

A 3,000Å thick film of amorphous silicon nitride was formed on the semiconductor layer and the substrate by plasma CVD under the following conditions:
Conditions
Gas Pressure: 2 Torr
Substrate Temperature: 250° C.
RF (13.56 MHz) Power: 200 W
Reaction Gas and Flow Rate:
SiH$_4$: 350 sccm
NH$_3$: 3,000 sccm The thin film of amorphous silicon nitride was patterned using a third mask, thereby forming a passivation layer having a predetermined size.

(7) Formation of Scanning Electrode Layer and Pixel Electrode Layer

A 3,000Å thick ITO (tin-indium oxide) film was formed on the metal layer and the passivation layer by sputtering. The ITO film was patterned using a fourth mask, thereby forming a scanning electrode layer and a pixel electrode layer.

(8) Formation of Alignment Layer

An SiO was used as an evaporation material for obliquely evaporation to form an alignment layer having an average thickness of 2,000Å.

Following the same procedures as in Manufacturing Example 1, 1,000 liquid crystal cells were used to arrange a liquid crystal display device and the device was driven to measure the percentage of defective liquid crystal cells.

The percentage of defective liquid crystal cells was as large as 50%, and the product yield was low.

The active matrix element in Comparative Example 1 requires a larger number of steps, and the process is time-consuming. In addition, a three-dimensional bulky pattern on the surface of the substrate is more typical than that of the present invention. For this reason, image variations caused by defective alignment layers tend to occur. In addition, pixel defects tend to occur due to peeling or electrical disconnections of the respective layers constituting the element.

<MANUFACTURING EXAMPLE 4>

An active matrix element according to the present invention was prepared by steps (1) through (5) below on the basis of the structure shown in FIGS. 6A and 6B.

(1) A 3,000Å thick ITO (indium-tin oxide) film was formed on a glass substrate by sputtering and was patterned by etching using a first mask to form a strip-like scanning electrode layer having a width of 40 $\mu$m, a small rectangular pixel electrode lead layer having a width of 40 $\mu$m, and a substantially square pixel electrode layer having dimensions of 500 $\mu$m × 500 $\mu$m and continuously connected with the pixel electrode lead layer.

(2) An 8,000Å thick continuous semiconductor film of phosphorus-doped amorphous silicon was formed on the scanning electrode layer and the pixel electrode lead layer by plasma CVD under the following conditions:

Conditions:
Gas Pressure: 0.3 Torr
Substrate Temperature: 300° C.
Reaction Gas and Flow Rate
  $PH_3$—$SiH_4$ Gas Mixture: 10 sccm
  (concentration ratio of $PH_3$ to $SiH_4$,
  i.e., $PH_3/SiH_4$: 100 ppm (volume ratio))
  Ar: 90 sccm (3) A 500Å thick platinum (Pt) film was formed on the semiconductor layer by electron beam evaporation and was patterned by the lift-off method using a third mask, thereby forming a second electrode layer.

(4) An element prepared by steps (1) through (4) was annealed in a vacuum of about $5 \times 10^{-6}$ Torr at a temperature of 200° C. for 30 minutes.

(5) The semiconductor thin film was patterned using as the mask the second electrode layer formed in step (4), so that the exposed portion of the thin film was removed to form a semiconductor layer having a predetermined pattern. As a result, an active matrix element of a pair of thin-film diodes connected in series and reversed-biased with each other was prepared.

A SiO as an evaporation material was obliquely evaporated on the inner surface (i.e., the surface with the active matrix element) of the substrate having the active matrix element prepared by the steps as described above to form an alignment layer having an average thickness of 2,000Å, thereby preparing a lower substrate.

A 3,000Å thick ITO (indium-tin oxide) counter electrodelayer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as low as 20% or less, and the product yield was found to be very high.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

By employing the constitution of the present invention, a highly reliable display device active matrix element can be manufactured by a small number of steps. More specifically, since flatness of the surface of the element can be achieved, peeling or electrical disconnections of the layers constituting the element tends to occur. In addition, the uniform stable Schottky barriers can be obtained by annealing in step (4), the liquid crystal cell free from image variations can be obtained.

<COMPARATIVE EXAMPLE 2>

Figure 2:
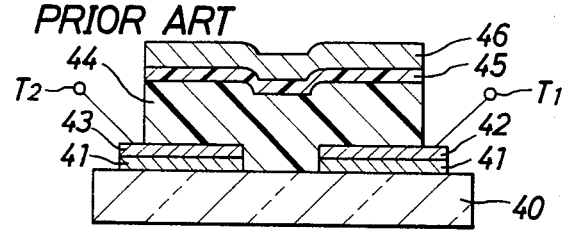
FIG. 2 is a sectional view showing a structure of a conventional back-to-back diode.

An active matrix element in Comparative Example 2 was prepared by steps (1) through (5) on the basis of the structure shown in FIG. 2 except that the first electrode and semiconductor layers were single layers.

(1) A 500Å thick platinum (Pt) layer was formed on a glass substrate by electron beam evaporation and was patterned by the lift-off method using a first mask to form a strip-like scanning electrode layer having a width of 40 $\mu$m and a small rectangular pixel electrode lead layer having a width of 40 $\mu$m.

(2) A 3,000Å thick ITO (tin-indium oxide) film was formed by sputtering and was patterned by etching using a second mask to form a square pixel electrode layer having dimensions of 500 $\mu$m and 500 $\mu$m to partially overlap the end portion of the pixel electrode lead layer.

(3) An 8,000Å thick continuous semiconductor film of phosphorus-doped amorphous silicon was formed on the scanning electrode and the pixel electrode lead layer by plasma CVD under the following conditions:

Conditions:
Gas Pressure: 0.3 Torr
Substrate Temperature: 300° C.
RF (13.56 MHz) Power: 15 W
Reaction Gas and Flow Rate
  $PH_3$—$SiH_4$ Gas Mixture: 10 sccm
  (concentration ratio of $PH_3$ to $SiH_4$,
  i.e., $PH_3/SiH_4$ 100 ppm (volume ratio))
  Ar: 90 sccm (4) A 3,000Å thick chromium (Cr) film for the second electrode layer was formed by sputtering.

(5) The thin films for the semiconductor layer and the second electrode layer were patterned by continuous etching using a third mask to form semiconductor and second electrode layers having a predetermined pattern.

(Preparation of Liquid Crystal Cell)

An SiO as an evaporation material was obliquely evaporated on the inner surface (i.e., the surface with the active matrix element) of the substrate having the active matrix element prepared by the steps as described above to form alignment layer having an average thickness of 2,000Å, thereby preparing a lower substrate.

A 3,000Å thick ITO (tin-indium oxide) counter electrode layer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as high as 80% or more, and the product yield was found to be very low.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

In Comparative Example 2, the number of photolithographic steps is larger than that in the present invention. Although flatness of the surface of the element could be obtained, peeling or electrical disconnections in the element of Comparative Example 2 tended to occur and the number of defective pixels was large.

The semiconductor layer was formed after the Schottky barrier electrode was formed. The Schottky barrier electrode was exposed to a high temperature, and annealing could not be performed under proper conditions. Stable Schottky barriers cannot be formed, and image variations in the liquid crystal cell in Comparative Example 2 are conspicuous.

<MANUFACTURING EXAMPLE 5>

A display device active matrix element according to the present invention was prepared by steps (1) through (4) below.

(1) A 3,000Å thick ITO (indium-tin oxide) was formed on a glass substrate by sputtering and was patterned by etching using a first mask to form a strip-like scanning electrode layer having a width of 40 μm, a rectangular pixel electrode lead layer having a width of 40 μm, and a square pixel electrode layer having dimensions 500 μm×500 μm and continuously connected with the pixel electrode lead layer.

(2) An 8,000Å thick continuous semiconductor film of amorphous silicon was formed on the scanning electrode layer and the pixel electrode lead layer thin film by plasma CVD.

(3) A 1,000Å thick chromium (Cr) film was evaporated on the semiconductor layer by electron beam evaporation to form a second electrode layer thin film.

(4) The semiconductor layer thin film and the second electrode layer thin film were patterned by continuous etching using a second mask, thereby obtaining semiconductor and second electrode layers having a predetermined shape.

(Preparation of Liquid Crystal Cell)

An SiO as an evaporation material was obliquely evaporated on the inner surface (i.e., the surface with the active matrix element) of the substrate having the active matrix element prepared by the steps as described above to form a 2,000Å thick alignment layer, thereby preparing a lower substrate.

A 3,000Å thick ITO (tin-indium oxide) counter electrode layer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as low as 20% or less, and the product yield was found to be very high.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

By employing the constitution of the present invention, a highly reliable display device active matrix element can be manufactured by a small number of steps. More specifically, since flatness of the surface of the element can be achieved, peeling or electrical disconnections of the layers constituting the element tend not to occur. In addition, the alignment layers can be optimally formed, thereby obtaining liquid crystal cells free from image variations.

<MANUFACTURING EXAMPLE 6>

A display device active matrix element according to the present invention was prepared by steps (1) through (5) below.

(1) A 1,000Å thick nickel (Ni) film was formed on a glass substrate by sputtering, and a 1,000Å thick chromium (Cr) film was formed on the nickel film. These films were patterned by etching using a two-layered strip-like first electrode layer serving as a scanning electrode layer and having a width of 40 μm, and a two-layered rectangular first electrode layer serving as a pixel electrode lead layer and having a width of 40 μm.

(2) A 3,000Å thick ITO (indium-tin oxide) film was formed by sputtering and patterned by etching using a second mask, thereby forming a square pixel electrode layer having dimensions of 500 µm×500 µm so as to partially overlap the pixel electrode lead layer.

(3) An 8,000Å thick continuous semiconductor layer of an amorphous silicon thin film was formed on the first electrode layers by plasma CVD.

(4) A 1,000Å thick second electrode layer of a chromium (Cr) thin film was formed on the semiconductor layer thin film by electron beam evaporation.

(5) The semiconductor layer thin film and the second electrode layer thin film were patterned by continuous etching using a third mask, thereby forming semiconductor and second electrode layers having a predetermined pattern.

(Preparation of Liquid Crystal Cell)

An SiO as an evaporation material was obliquely evaporated on the inner surface (i.e., the surface with the active matrix element) of the substrate having the active matrix element prepared by the steps as described above to form a 2,000Å thick alignment layer, thereby preparing a lower substrate.

A 3,000Å thick ITO (indium-tin oxide) counter electrode layer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as low as 20% or less, and the product yield was found to be very high.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

By employing the constitution of the present invention, a highly reliable display device active matrix element can be manufactured by a small number of steps. More specifically, since flatness of the surface of the element can be achieved and the first electrode layer has a multilayered structure of at least two layer portions so that the layer portion contacting the substrate has high adhesion strength with respect to the substrate, peeling or electrical disconnections of the layers constituting the element tend not to occur. In addition, since the alignment layers can be optimally formed, a display device free from image variations can be realized.

<MANUFACTURING EXAMPLE 7>

A display device active matrix element according to the present invention was prepared by steps (1) through (4) below.

(1) A 1,000Å thick ITO (indium-tin oxide) film was formed on a glass substrate by sputtering and was patterned by etching using a first mask to prepare a strip-like thin film having a width of 40 µm, a square pixel electrode layer having dimensions of 500 µm×500 µm, and a transparent layer serving as a first electrode layer integrally formed with the pixel electrode layer.

A 1,000Å thick chromium (Cr) film was formed on the above thin films by sputtering and a 1,000Å thick film of highly doped n-type amorphous silicon (n+a-Si H) was evaporated on the chromium film by plasma CVD. Patterning was performed by etching using a second mask, thereby forming a strip-like first electrode layer having a three-layered structure and a width of 40 µm and a small rectangular first electrode layer having a width of 40 µm and a three-layered structure.

(2) An 8,000Å thick continuous film of the semiconductor layer of amorphous silicon was formed on the first electrode layers by plasma CVD.

(3) A 1,000Å thick chromium (Cr) thin film for the second electrode layer was formed on the thin film of the semiconductor layer.

(4) The thin films of the semiconductor layer and the second electrode layer were patterned by continuous etching using a third mask, thereby forming semiconductor and second electrode layers having a predetermined pattern.

(Preparation of Liquid Crystal Cell)

An SiO as an evaporation material was obliquely evaporated on the inner surface (i.e., the surface with the active matrix element) of the substrate having the active matrix element prepared by the steps as described above to form a 2,000Å thick alignment layer, thereby preparing a lower substrate.

A 1,000Å thick ITO (indium-tin oxide) counter electrode layer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as low as 20% or less, and the product yield was found to be very high.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

(Light Degradation Test)

The first electrode layer of each liquid crystal cell was irradiated by a tungsten lamp (200 mW/cm$^2$) from the substrate side for 100 hours continuously. After the irradiation of light, the liquid crystal cell was actually driven. No switching errors of the active matrix elements occurred, and all pixels were properly operated to provide normal display characteristics.

COMPARATIVE EXAMPLE 3

Following the same procedures as in Manufacturing Example 1, 1,000 liquid crystal cells were prepared except that each first electrode layer comprised a single ITO (tin-indium oxide) layer.

(Light Degradation Test)

The first electrode layer of each liquid crystal cell was irradiated by a tungsten lamp (200 mW/cm$^2$) from the substrate side for 100 hours continuously. After irradiation of light, the liquid crystal cell was actually driven. The percentage of pixel defects caused by switching errors of the active matrix elements was as high as 20%.

<MANUFACTURING EXAMPLE 8>

(Fabrication of Active Matrix Element)

A display device active matrix element was manufactured by steps (1) through (3) below.

(1) A 1,000Å thick transparent conductive layer ITO (indium-tin oxide) film was formed on a glass substrate by sputtering. A 1,000Å thick metal layer of chromium (Cr) film was formed to cover the entire surface of the ITO film.

Patterning was performed by etching using a first mask to form a thin film portion for a scanning electrode layer, a thin film portion for a pixel electrode lead layer, and a thin film portion for a pixel electrode layer continuously formed with the pixel electrode lead layer. The thin film portion for the scanning electrode layer was a strip having a width of about 40 μm. The thin film portion for the pixel electrode lead layer had a small rectangular portion having a width of about 40 μm. The thin film portion for the pixel electrode layer was a square portion having dimensions of 500 μm×500 μm.

(2) An 8,000Å thick amorphous silicon film for the semiconductor layer was formed by plasma CVD on the region including the thin film portions for the scanning electrode layer, the pixel electrode lead layer, and the pixel electrode layer.

Subsequently, a resist was applied to the thin film for the semiconductor layer and was etched by using a second mask to leave a predetermined resist pattern. A 1,000Å thick platinum (Pt) thin film for the second electrode layer was formed by electron beam evaporation.

The thin film for the second electrode layer was patterned by the lift-off method to leave a predetermined second electrode layer having a predetermined shape. The thin film for the semiconductor layer was patterned by etching using the second electrode pattern as a mask, thereby forming a semiconductor layer having a predetermined pattern.

(3) Exposed portions of the thin film for the metal layer, i.e., an unnecessary metal layer of the upper layer of the thin film portion for the scanning electrode layer, an unnecessary metal layer of the upper layer of the thin film portion for the pixel electrode lead layer, and a metal layer of the upper layer of the thin film portion for the pixel electrode layer were etched using the remaining semiconductor layer and the second electrode layer as masks, thereby preparing an active matrix element of a pair of thin-film diodes connected in series and reverse-biased with each other.

(Preparation of Liquid Crystal Cell)

An SiO as an evaporation material was obliquely evaporated on the inner surface (i.e., the surface with the active matrix element) of the substrate having the active matrix element prepared by steps (1) through (3) to form a 2,000Å thick alignment layer, thereby preparing a lower substrate.

A 1,000Å thick ITO (indium-tin oxide) counter electrode layer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as low as 20% or less, and the product yield was found to be very high.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

<MANUFACTURING EXAMPLE 9>

A display device active matrix element according to the present invention was prepared by steps (1) through (5) below.

(1) A 1,000Å thick ITO (indium-tin oxide) film was formed on a glass substrate by sputtering.

(2) The ITO thin film was patterned by etching using a first mask to form a strip-like scanning electrode layer having a width of 40 μm, a small rectangular pixel electrode lead layer having a width of 40 μm, and a square pixel electrode layer having dimensions 500 μm×500 μm and continuously formed with the pixel electrode lead layer.

(3) An 8,000Å thick continuous semiconductor thin film of amorphous silicon was formed on the scanning electrode layer and the pixel electrode lead layer by plasma CVD.

(4) A 1,000Å thick chromium (Cr) film for the second electrode layer was formed on the semiconductor layer thin film by electron beam evaporation.

(5) The semiconductor thin film and the metal thin film for the second electrode layer were patterned by continuous etching using a second mask, thereby forming semiconductor and second electrode layers which continuously extend to entirely cover the scanning electrode and pixel electrode lead layers along the widthwise direction.

(Preparation of Liquid Crystal Cell)

An SiO as an evaporation material was obliquely evaporated on the inner surface (i.e., the surface with the active matrix element) of the substrate having the active matrix element prepared by steps (1) through (3)

to form a 2,000Å thick alignment layer, thereby preparing a lower substrate.

A 1,000Å thick ITO (indium-tin oxide) counter electrode layer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as low as 20% or less, and the product yield was found to be very high.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

(Tests for Symmetry)

A switching test was performed such that a voltage was applied to set the scanning electrode layer as a positive layer and the pixel electrode lead layer as a negative layer, thereby switching the active matrix element. A similar test was also performed such that a voltage was applied to set the scanning electrode layer as a negative layer and the pixel electrode lead layer as a positive layer, thereby switching the active matrix element. Equivalent switching operations were performed in both tests.

<MANUFACTURING EXAMPLE 10>

An active matrix element was prepared by steps (1) through (4) described below.

(1) A 1,000Å thick chromium (Cr) film for the first electrode layers was formed on a glass substrate by sputtering.

The Cr film was etched using a first mask to form first electrode layers respectively serving as scanning electrode and pixel electrode lead layers. The first electrode layer serving as the scanning electrode layer was a strip-like layer having a width of 40 μm. The first electrode layer serving as the pixel electrode lead layer was a small rectangular layer having a width of 40 μm.

A thin film for the pixel electrode made of a 1,000Å thick transparent ITO (indium-tin oxide) conductive layer was formed on the substrate by sputtering. Patterning was performed by etching using the ITO layer as a second mask to form a square pixel electrode layer having dimensions of 500 μm×500 μm. The end portion of the pixel electrode layer was formed on the first electrode layer serving as the pixel electrode lead layer and was electrically connected thereto.

(2) An 8,000Å thick amorphous silicon film was formed by plasma CVD on an element formation region including the two first electrode layers.

(3) A photoresist film was patterned for a lift-off step on the semiconductor thin film. A 1,000Å thick platinum (Pt) film was formed by evaporation and was patterned by the lift-off method, thereby forming the second electrode layer having a predetermined pattern.

(4) The semiconductor thin film was patterned using as the mask the second electrode layer formed in step (3), so that the exposed portion of the thin film was removed to form a semiconductor layer having a predetermined pattern. As a result, an active matrix element of a pair of thin-film diodes connected in series and reversed-biased with each other was prepared.

(Preparation of Liquid Crystal Cell)

An SiO as an evaporation material was obliquely evaporated on the inner surface (i.e., the surface with the active matrix element) of the substrate having the active matrix element prepared by steps (1) through (4) to form a 2,000Å thick alignment layer, thereby preparing a lower substrate.

A 1,000Å thick ITO (indium-tin oxide) counter electrode layer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as low as 20% or less, and the product yield was found to be very high.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

As a comparative example, patterning of the semiconductor layer and patterning of the second electrode layer were independently performed in separate photolithographic steps to prepare an active matrix element. Following the same procedures as described above, 1,000 liquid crystal cells were prepared and were actually driven. The percentage of defective liquid crystal cells was 50% or more. Therefore, the yield was much lower than that of a case to which the present invention is applied.

<MANUFACTURING EXAMPLE 11>

An active matrix element according to the present invention was prepared by steps (1) through (5) described below.

(1) A 1,000Å thick chromium (Cr) film was formed on a glass substrate by sputtering and was patterned by etching using a first mask to form a strip-like first electrode layer serving as a scanning electrode layer and having a width of 40 μm and a small rectangular first electrode layer serving as a pixel electrode lead layer and having a width of 40 μm.

Subsequently, a 3,000Å thick ITO (indium-tin oxide) film was formed on the substrate by sputtering and was patterned by etching using a second mask to form a substantially square pixel electrode layer having dimensions of 500 μm×500 μm. The end region of the pixel electrode layer was formed on the first electrode layer serving as the pixel electrode lead layer and was electrically connected thereto.

(2) A 4,000Å thick amorphous silicon film for a semiconductor layer on the first electrode layers was formed by plasma CVD using SiH$_4$ (silane) and Ar (argon) gases as reaction gases.

(3) A 4,000Å thick phosphorus-doped amorphous silicon film for an upper layer portion of the semiconductor layer which was to be continuous with the thin film of the lower layer of the semiconductor layer was formed by using SiH$_4$ (silane), Ar (argon), and PH$_3$ (phosphine) gases as reaction gases under the condition wherein a volume ratio of PH$_3$ to SiH$_4$ was 100 ppm.

(4) The thin film for the lower layer portion of the semiconductor layer and the thin film for the upper layer portion of the semiconductor layer were patterned by etching using a third mask, thereby forming a semiconductor layer having a two-layered structure of a lower portion having a low conductivity and integrally formed on the two first electrode layers and an upper layer having a high conductivity.

(5) A 1,000Å thick platinum (Pt) film for a second electrode layer was formed on the semiconductor layer by electron beam evaporation and was patterned by the lift-off method, thereby forming the second electrode integrally formed on the semiconductor layer.

(Preparation of Liquid Crystal Cell)

An SiO as an evaporation material was obliquely evaporated on the inner surface (i.e., the surface with the active matrix element) of the substrate having the active matrix element prepared by steps (1) through (4) to form a 2,000Å thick alignment layer, thereby preparing a lower substrate.

A 1,000Å thick ITO (indium-tin oxide) counter electrode layer was formed on a glass substrate serving as an upper substrate, and an SiO as an evaporation material was obliquely evaporated on the ITO counter electrode layer to form an alignment layer as the evaporation layer having an average thickness of 2,000Å.

The upper and lower substrates were opposed to each other and a liquid crystal was sealed therebetween, thus preparing a liquid crystal cell.

(Yield)

One thousand liquid crystal cells were formed in the manner described above and were driven and tested. The percentage of defective liquid crystal cells was measured. The percentage was as low as 20% or less, and the product yield was found to be very high.

A good liquid crystal cell is defined as the one having a practically satisfactory contrast ratio and alignment angle uniformity. A defective liquid crystal cell is defined as the one having alignment angle nonuniformity although the contrast ratio is practically satisfactory, the one subjected to image variations caused by alignment angle nonuniformity, or the one having pixel defects caused by peeling or electrical disconnections of the layers constituting the active matrix element.

(Switching Performance)

Voltage-current characteristics $(I=I_1 \cdot V_a + I_0)$ of these liquid crystal cells were examined. The value a was as large as 7.5 and a leakage current $I_0$ was as small as 1 pA. These cells were properly switched in response to a low drive voltage of about 10 V.

<MANUFACTURING EXAMPLE 12>

Following the same procedures as in step (1) in Manufacturing Example 11, an 8,000Å thick semiconductor film was continuously formed on the two first electrode layers by using Ar (argon), PH$_3$ (phosphine), and SiH$_4$ (silane) gases such that a concentration ratio of PH$_3$ to SiH$_4$ (i.e., PH$_3$/SiH$_4$) was gradually changed from 0 ppm (start of film formation) to 250 ppm (end of film formation).

The resultant semiconductor thin film was patterned to form a semiconductor layer. The semiconductor layer had a two-layered structure of a lower layer portion formed on the first electrode layers and having a low conductivity and an upper layer portion having a high conductivity.

Following the same procedures as in steps (4) and (5) in Manufacturing Example 11, an active matrix element was prepared.

(Preparation of Liquid Crystal Cell)

Following the same procedures as in Manufacturing Example 11, 1,000 liquid crystal cells each using the substrate having the active matrix element manufactured as described above were prepared.

(Yield)

These liquid crystal cells were actually driven to measure the percentage of defective liquid crystal cells, following the same procedures as in Manufacturing Example 11. The percentage of defective liquid crystal cells was as high as 20% or less.

(Switching Performance)

Voltage-current characteristics $(I=I_1 \cdot V_a + I_0)$ of these liquid crystal cells were examined. The value a was as large as 7.0 and a leakage current $I_0$ was as small as 5 pA. These cells were properly switched in response to a low drive voltage of about 13 V.

<MANUFACTURING EXAMPLE 13>

Following the same procedures as in step (1) in Manufacturing Example 11 except that a mixture gas (concentration ratio of CH$_4$ to SiH$_4$: 1%) of Ar, CH$_4$, and SiH$_4$ was used as a reaction gas in step (2) of Manufacturing Example 11, a thin film for the lower layer portion of the semiconductor layer was prepared.

Following the same procedures as in steps (3) through (5) in Manufacturing Example 11, an active matrix element was prepared.

(Preparation of Liquid Crystal Cell)

Following the same procedures as in Manufacturing Example 11, 1,000 liquid crystal cells each using the substrate having the active matrix element manufactured as described above were prepared.

(Yield)

These liquid crystal cells were actually driven to measure the percentage of defective liquid crystal cells, following the same procedures as in Manufacturing Example 11. The percentage of defective liquid crystal cells was as high as 20% or less.

(Switching Performance)

Voltage-current characteristics $(I=I_1 \cdot V_a + I_0)$ of these liquid crystal cells were examined. The value a was as large as 7.2 and a leakage current $I_0$ was as small as 1 pA. These cells were properly switched in response to a low drive voltage of about 15 V.

What is claimed is:

1. An active matrix element of a pair of thin-film diodes connected in series and back-to-back with each other, wherein said pair of thin-film diodes comprises two first electrode layers formed on a substrate and spaced apart from each other, semiconductor layers respectively formed on said first electrode layers, and a second electrode layer integrally formed on said semiconductor layers and constituting Schottky barriers with said semiconductor layers and said second electrode layer.

2. An element according to claim 1, wherein at least one of said first electrode layers is opaque.

3. An element according to claim 2, wherein said at least one of said first electrode layers comprises a material selected from the group consisting of chromium, nickel, Nichrome, aluminum, molybdenum, magnesium, and highly doped n-type amorphous silicon.

4. An element according to claim 1, wherein said at least one of said first electrode layers is transparent.

5. An element according to claim 4, wherein said at least one of said first electrode layers comprises a material selected from the group consisting of ITO, stannic oxide, and zinc oxide.

6. An element according to claim 1, wherein a thickness of said first electrode layer falls within a range of 500Å to 1 μm.

7. An element according to claim 1, wherein at least one of said semiconductor layers comprises a material selected from the group consisting of undoped amorphous silicon, phosphorus- or arsenic-doped amorphous silicon, fluorinated amorphous silicon, polysilicon, amorphous silicon carbide, amorphous silicon nitride, amorphous silicon germanium, tellurium, and selenium.

8. An element according to claim 1, wherein a thickness of said semiconductor layer falls within a range of 500Å to 2 μm.

9. An element according to claim 1, wherein said semiconductor layer comprises a plurality of layer portions having different conductivities determined such that the conductivity of a lower layer portion of said semiconductor layer on a first electrode side is lower than that of an upper layer portion of said semiconductor layer on a second electrode side.

10. An element according to claim 1, wherein said semiconductor layers have a conductivity gradient declining from an upper layer portion of said semiconductor layer on a second electrode layer side to a lower layer portion thereof on a first electrode layer side.

11. An element according to claim 9, wherein a material for forming a semiconductor layer having a low conductivity is a material selected from the group consisting of undoped amorphous silicon, polysilicon, fluorinated amorphous silicon, amorphous silicon germanium, amorphous silicon carbide, amorphous silicon nitride, and amorphous germanium carbide.

12. An element according to claim 9, wherein a material for forming a semiconductor layer having a high conductivity is a material selected from the group consisting of phosphorus- or arsenic-doped amorphous silicon, amorphous silicon germanium, tellurium, selenium, polysilicon, and microcrystal silicon.

13. An element according to claim 9, wherein a thickness of said layer portion having the low conductivity falls within a range of 500Å to 1.9 μm.

14. An element according to claim 1, wherein said second electrode layer comprises a material selected from the group consisting of platinum, gold, palladium, tungsten, rhodium, titanium, molybdenum, iridium, chromium, nickel, and Nichrome.

15. An element according to claim 1, wherein a thickness of said second electrode layer falls within a range of 50 to 5,000Å.

16. An element according to claim 1, wherein said at least one of said pair of first electrode layers serves as a scanning electrode layer, and the other one thereof serves as a pixel electrode lead layer having the same width as that of said scanning electrode layer, and said semiconductor layers and said second electrode cover said scanning electrode layer and said pixel electrode lead layer in a widthwise direction.

17. An element according to claim 1, wherein one of said first electrode layers is opaque and the other of said first electrode layers is transparent.

18. An element according to claim 3, wherein the thickness of said first electrode layer falls within a range of 500Å to 2000Å.

19. An element according to claim 17, wherein the thickness of said first electrode layer falls within a range of 500Å to 2000Å.

20. An active matrix element for use in a liquid crystal cell of a pair of thin-film diodes connected in series and back-to-back with each other, the liquid crystal cell including an upper substrate, a counter electrode layer disposed on said upper substrate, a pixel electrode layer disposed on said lower substrate opposed to said counter electrode, first and second alignment layers disposed on said upper and lower substrates, respectively, and a liquid crystal layer disposed between said first and second alignment layers, said active matrix element comprising:

two first electrode layers disposed on said lower substrate, said two first electrode layers being spaced from each other, one of said first electrode layers being in ohmic contact with said pixel electrode layer;

two semiconductor layers disposed on said two first electrode layers, said two semiconductor layers being spaced from each other; and a second electrode layer disposed on said two semiconductor layers to form a Shottky barrier between said second electrode and said two semiconductor layers, said second electrode layer being continuous.

21. An active matrix element for use in a liquid crystal cell of a pair of thin-film diodes connected in series and back-to-back with each other, the liquid crystal cell including an upper substrate, a lower substrate spaced from and parallel to the upper substrate, a pixel electrode layer disposed on the lower substrate opposed to the counter electrode, first and second alignment layers disposed on the upper and lower substrates, respectively, and a liquid crystal layer disposed between the first and second alignment layers, the active matrix element comprising:

two first electrode layers disposed on said lower substrate, said two first electrode layers being spaced from each other, one of said two first electrode layers being formed integrally with each pixel electrode layer;

two semiconductor layers disposed on said two first electrode layers, said two semiconductor layers being spaced from each other; and a second electrode layer disposed on said two semiconductor layers to form a Shottky barrier between said second electrode and said two semiconductor layers, said second electrode layer being continuous.

22. An active matrix element for use in a liquid crystal cell of a pair of thin-film diodes connected in series and back-to-back with each other, the liquid crystal cell including an upper substrate, a lower substrate spaced from and parallel to the upper substrate, a counter electrode layer disposed on the upper substrate, a pixel electrode layer disposed on the lower substrate opposed to the counter electrode, first and second alignment layers disposed on the upper and lower substrates, respectively, and a liquid crystal layer disposed between the first and second alignment layers, the active matrix element comprising;
- two first electrode layers disposed on said lower substrate, said two first electrode layers being spaced from each other, one of said two first electrode layers being formed integrally with each pixel electrode layer;
- a continuous semiconductor layer disposed on said two first electrode; and
- a second electrode layer disposed on said semiconductor layer to form a Shottky barrier between said second electrode and said continuous semiconductor layer, said second electrode layer being continuous.

23. An active matrix element as claimed in claim 22, wherein said pixel electrode layer includes an ear extending therefrom, said one of said two first electrode layers being formed integrally with said ear extending from said pixel electrode layer.

24. An active matrix element for use in a liquid crystal cell of a pair of thin-film diodes connected in series and back-to-back with each other, the liquid crystal cell including an upper substrate, a lower substrate spaced from and parallel to the upper substrate, a counter electrode layer disposed on the upper substrate, a pixel electrode layer disposed on the lower substrate opposed to the counter electrode, first and second alignment layers disposed on the upper and lower substrates, respectively, and a liquid crystal layer disposed between the first and second alignment layers, the active matrix element comprising:
- two first electrode layers disposed on said lower substrate, said two first electrode layers being spaced from each other, one of said two first electrode layers being in ohmic contact with said pixel electrode layer, each of said two first electrode layers including a lower layer portion adjacent said substrate and an upper layer portion disposed on said lower layer portion;
- a continuous semiconductor layer disposed on said two first electrode layer; and
- a second electrode layer disposed on said semiconductor layer to from a Shottky barrier between said second electrode and said continuous semiconductor layers, said second electrode layer being continuous.

25. An active matrix element for use in a liquid crystal cell of a pair of thin-film diodes connected in series and back-to-back with each, the liquid crystal cell including an upper substrate, a lower substrate spaced from and parallel to the upper substrate, a counter electrode layer disposed on the upper substrate, a pixel electrode layer disposed on the lower substrate opposed to the counter electrode, first and second alignment layers disposed on the upper and lower substrates, respectively, and a liquid crystal layer disposed between the first and second alignment layers, the active matrix element comprising:
- two first electrode layers disposed on said lower substrate, said first electrode layers being spaced from each other, each of said two first electrode layers including an upper layer portion, an intermediate layer portion and a lower layer portion said upper layer portion including an opaque layer of highly doped n-type amorphous silicon, said intermediate layer portion including chromium opaque layers and said lower layer portions including an inidium-tin oxide transparent material, one of said lower layer portions of said two first electrode layers being formed integral with said pixel electrode layer;
- a continuous semiconductor disposed on said two first electrode layers; and
- a second electrode layer disposed on said semiconductor layers to from a Shottky barrier between said second electrode layer and said continuous semiconductor layer, said second electrode layer being continuous.

26. An active matrix element for use in a liquid crystal cell of a pair of thin-film diodes connected in series and back-to-back with each other, the liquid crystal cell including an upper substrate, a lower substrate spaced from and parallel to the upper substrate, a counter electrode layer disposed on the upper substrate, a pixel electrode layer disposed on the lower substrate opposed to the counter electrode, first and second alignment layers disposed on the upper and lower substrates, respectively, and a liquid crystal layer disposed between the first and second alignment layers, the active matrix element comprising:
- a scanning electrode lead layer disposed on said substrate;
- a pixel electrode lead layer disposed on said substrate and spaced from said scanning electrode lead layer, said pixel electrode lead layer being formed integrally with said pixel electrode;
- a first metal layer formed on said scanning electrode lead layer;
- a second metal layer formed on said pixel electrode lead layer;
- a continuous semiconductor layer formed on said scanning electrode lead layer and said pixel electrode lead layer; and
- a second electrode layer formed on said semiconductor layer to form a Shottky barrier between said second electrode layer and said continuous semiconductor layer, said second electrode layer being continuous.

27. An active matrix element for use in a liquid crystal cell of a pair of thin-film diodes connected in series and back-to-back with each other, the liquid crystal cell including an upper substrate, a lower substrate spaced from and parallel to the upper substrate, a counter electrode layer disposed on the upper substrate, a pixel electrode layer disposed on the lower substrate opposed to the counter electrode, first and second alignment layers disposed on the upper and lower substrates, respectively, and a liquid crystal layer disposed between the first and second alignment layers, the active matrix element comprising:
- a scanning electrode lead layer disposed on said substrate;

a pixel electrode lead layer disposed on said substrate and spaced from said scanning electrode lead layer, said pixel electrode lead layer being formed integrally with said pixel electrode;

a continuous semiconductor layer for encapsulating said scanning electrode lead layer and said pixel electrode lead layer; and a second electrode layer formed on said semiconductor layer to form a Shottky barrier between said second electrode layer and said continuous semiconductor layer, said second electrode layer being continuous.

28. An active matrix element for use in a liquid crystal cell of a pair of thin-film diodes connected in series and back-to-back with each other, the liquid crystal cell including an upper substrate, a lower substrate spaced from and parallel to the upper substrate, a counter electrode layer disposed on the upper substrate, a pixel electrode layer disposed on the lower substrate opposed to the counter electrode, first and second alignment layers disposed on the upper and lower substrates, respectively, and a liquid crystal layer disposed between the first and second alignment layers, the active matrix element comprising:

two first electrode layers disposed on said lower substrate, said two first electrode layers being spaced from each other, one of said two first electrode layers being in ohmic contact with said pixel electrode layer;

a continuous semiconductor layer disposed on said two first electrode layers; and a second electrode layer disposed on said continuous semiconductor layer to form a Shottky barrier between said second electrode and said continuous semiconductor layer, said second electrode layer being continuous.

29. An active matrix element as claimed in claims 22, 24, 25, 26, or 28, wherein said continuous semiconductor layer includes a lower layer portion adjacent said first electrode layers and an upper layer portion disposed on said lower layer portion, said lower layer portion comprised of a material of a low conductivity and said upper layer portion comprised of a material of a high conductivity.

* * * * *

UNITED STATES PATENT AND TRADEMARK OFFICE
CERTIFICATE OF CORRECTION

PATENT NO. : 4,907,040
DATED : March 06, 1990
INVENTOR(S) : Hiroshi Kobayashi et al.

It is certified that error appears in the above-identified patent and that said Letters Patent is hereby corrected as shown below:

Claim 16, Column 30, Line 14, "cover" should be followed by --,--;

Claim 20, Column 30, Line 46, "Shottky" should be --Schottky--;

Claim 21, Column 31, Line 2, "Shottky" should be --Schottky--;

Claim 22, Column 31, Line 24, "electrode" should be followed by --layers--;

Claim 22, Column 31, Line 26, "Shottky" should be --Schottky--;

Claim 24, Column 31, Line 56, "layer" should be --layers--;

UNITED STATES PATENT AND TRADEMARK OFFICE
CERTIFICATE OF CORRECTION

PATENT NO. : 4,907,040

DATED : March 06, 1990

INVENTOR(S) : Hiroshi Kobayashi et al.

It is certified that error appears in the above-identified patent and that said Letters Patent is hereby corrected as shown below:

Claim 25, Column 32, Line 9, "portion" (second occurance) should be followed by --,--.

Claim 26, Column 32, Line 51, "Shottky" should be --Schottky--;

Claim 27, Column 33, Line 9, "Shottky" should be --Schottky--;

Claim 28, Column 34, Line 11, "Shottky" should be --Schottky--.

Signed and Sealed this

Eighth Day of December, 1992

*Attest:*

DOUGLAS B. COMER

*Attesting Officer*   *Acting Commissioner of Patents and Trademarks*